United States Patent [19]

Owen et al.

[11] 3,950,612

[45] Apr. 13, 1976

[54] SYNTHETIC MOTION GENERATOR

[75] Inventors: Joseph R. Owen, Orlando; Carl R. Driskell, Winter Park, both of Fla.

[73] Assignee: The United States of America as represented by the Secretary of the Navy, Washington, D.C.

[22] Filed: Apr. 14, 1975

[21] Appl. No.: 567,661

[52] U.S. Cl. ............ 178/6.8; 178/DIG. 35; 35/10.2
[51] Int. Cl.² ..................... G01C 21/00; H04N 5/22
[58] Field of Search ........ 178/6.8, DIG. 35; 35/10.2

[56] References Cited
UNITED STATES PATENTS 3,872,244  3/1975  Vaughan-Jones............ 178/DIG. 35

Primary Examiner—Robert L. Griffin
Assistant Examiner—John C. Martin
Attorney, Agent, or Firm—Richard S. Sciascia; John W. Pease

[57] ABSTRACT

A synthetic motion generator system including a TV camera positioned to record a still life scene and a TV monitor connected to receive video signals from the TV camera and in which the vertical and/or horizontal sweep input to the camera is modulated by apparatus including a tuneable oscillator, a sawtooth generator and logic converter and sample and hold circuitry to provide to the camera sweep circuit a modulating signal which is a multiple of the television frame rate, plus or minus a few cycles per second, to thereby generate desired motion in the monitor display image. The invention is particularly applicable to the generation of sea wave motion from a still seascape scene and in this environment the invention includes not only the development of wave motion, but of speed and amplitude control as well as apparent direction variation. These functions are obtained through the medium of frequency and amplitude adjustment on the oscillator equipment and the provision of an input potentiometer and wiper arms connected to the oscillators to coordinately frequency vary the same to produce the desired wave function in association with the direction of a periscope operating the wiper arms.

5 Claims, 6 Drawing Figures

SYNTHETIC MOTION GENERATOR

CROSS REFERENCES

In periscope view simulators such as those described in U.S. Pat. Nos. 3,479,454 and 3,507,989, it is desirable to provide wave motion in the background scene for more realistic simulation.

BACKGROUND OF THE INVENTION

This invention relates to the field of simulation of moving objects by way of electronically generated image modifications. In the past, movement of images in simulators has been accomplished by motion pictures of a desired scene and also by actual movement of model objects incorporated in a scene. Under the subject invention the necessary apparent motion need not require model movement nor motion pictures, and further is not limited to a single recorded motion scene. The motion may be produced from a still life scene by appropriate modulation of camera sweep input signals. The invention is particularly applicable to sea wave motion, and in relation thereto provision is made under the invention to electronically generate the appearance of sea wave motion in a still life seascape scene such that the waves move realistically across the display seascape scene, the amplitude and speed of the waves is controllable according to simulated sea state, and the apparent direction of the wave motion can be changed in accordance with periscope rotation (bearing).

SUMMARY

The invention incorporates in a synthetic sea wave generator the provision of sawtooth generators and tuneable oscillators to modulate sweep voltages of a television camera to generate realistic wave motion in a seascape scene. Also, a video-to-logic converter is used in conjunction with a sample and hold circuit to sample the camera video output voltage, determine the horizon position, and initiate the camera sweep modulation below the horizon. The sawtooth generator changes the amplitude of the camera sweep modulation voltage from a zero modulation voltage at the distant horizon to a maximum modulation at the bottom of the display screen. The basic principal of the device wherein a stretching and distortion type of motion is provided by appropriate modulation of camera sweep signal is also applicable to any application where such motion is desirable. Examples of possible applications include the waving of wheat or grass in the wind, or the demonstration of ground heat effect.

DESCRIPTION OF THE PREFERRED EMBODIMENTS

It is to be understood that the subject invention in its broad aspect is applicable to any application wherein it is desirable to simulate motion via the medium of electronic circuitry such that still life scenes may be used as the basis of the ultimate display and the employment of movement of models or the use of motion pictures is unnecessary.

For the purpose of explaining the invention, an application thereof to a synthetic sea wave motion generator has been selected. In the description to follow it will be explained how one may electronically generate the appearance of sea waves in a seascape scene such that (1) the waves move realistically across the display seascape scene, (2) the amplitude and speed of the waves can be controlled according to the simulated sea state and (3) the apparent direction of the wave motion can be changed in accordance with periscope rotation (bearing) and thus used in such periscope simulation apparatus as taught in U.S. Pat. Nos. 3,479,454 and 3,507,989.

In accordance with the invention, apparent wave motion is generated in a televised scene by appropriate modulation of the camera vertical and/or horizontal sweep signal. Wave motion is made to appear when the frequency of the modulating signal is a multiple of the television frame rate plus or minus a few cycles per second. When the frequency of the modulation signal is an exact multiple of the television frame frequency, the waves appear stationary. The apparent speed of the waves increases as the frequency of the modulating signal is offset from an exact multiple of the frame frequency. A realistic sea state being indicated by amplitude as well as speed and direction of waves, the apparent amplitude of the waves is varied by effecting a variation of the amplitude of the modulating signal as a function of the associated sweep. Thus, variation of amplitude on the vertical sweep may be employed to decrease realistically the wave height toward the horizon and variation in signal on the horizontal sweep may be used for variation in distances from the viewpoint, right and left.

Figure 1:
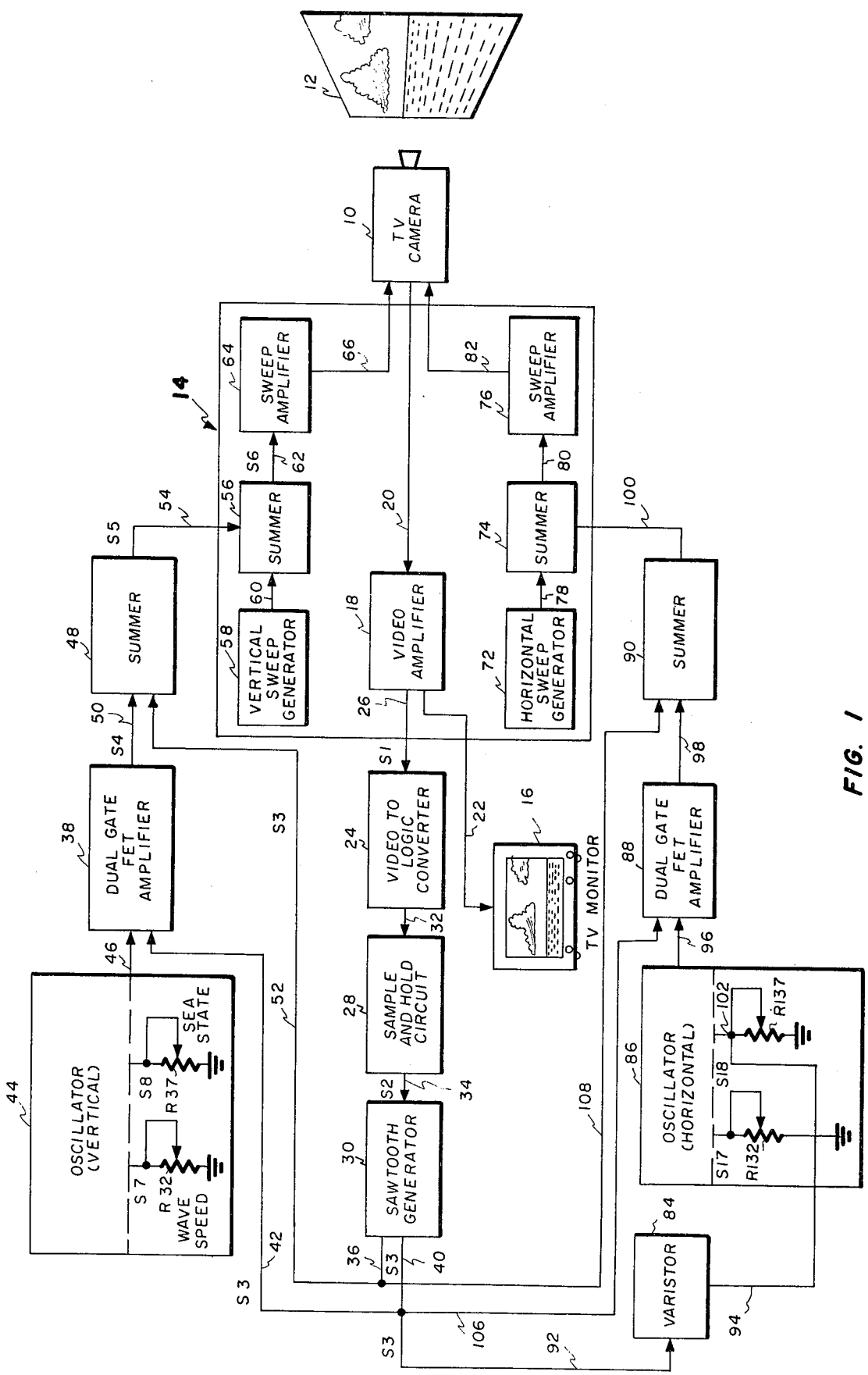
FIG. 1 is a block diagram of a synthetic sea wave generator incorporating the invention.
Figure 2:
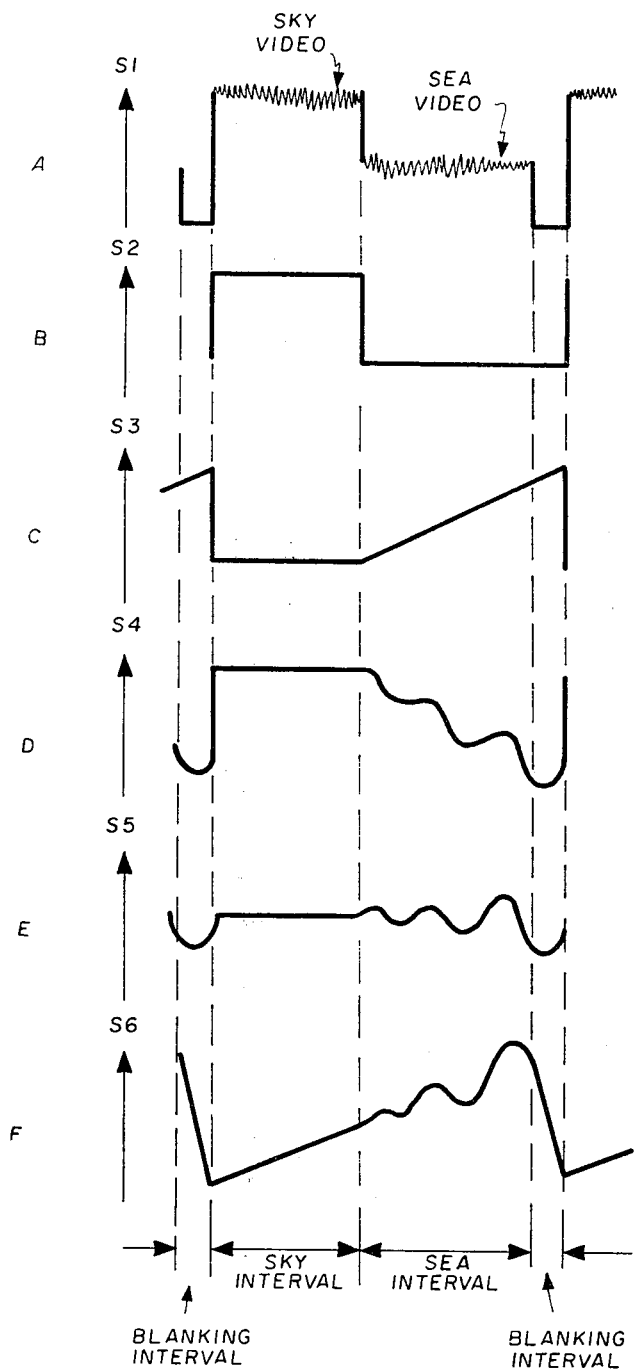
FIG. 2 is a series of sequential curves showing the various electrical signals as they are modified in progress through the system of FIG. 1.

Referring to FIG. 1, there is shown in block diagram apparatus incorporating the invention and capable of generating wave motion in a seascape scene. In FIG. 1 a television (TV) camera 10 is positioned to view a seascape scene 12 which is a still life photograph with no motion. The TV camera 10 is connected through a camera control unit 14 to a TV monitor 16 upon which will be shown the same seascape but with apparent wave motion through the medium of the electronic circuits to be described hereinafter. Camera control unit 14 incorporates a video amplifier 18 which is connected by lines 20 and 22 to pass a video signal from the camera 10 to the monitor 16 for display. When the sweeps of TV camera 10 are linear and in synchronism with the linear sweeps of the TV monitor 16, the seascape scene 12 will be displayed on TV monitor 16, distorted and with no apparent motion. However, when, in accordance with our invention, the sweeps of TV camera 10 are distorted by a modulating signal, the distortion, i.e., modulation of the camera sweeps will appear as geometric waves on the displayed scene. To achieve a desired repetitious wave motion in the displayed scene, a video-to-logic converter 24 is provided to sample the video signal from camera 10. The input signal S1 to converter 24 on line 26 is illustrated in FIG. 2, curve A. Since the sky is usually brighter than the seascape, the video signal corresponding to sky will be of greater voltage amplitude than the signal corresponding to the sea portion of the seascape 12. This difference in video signal amplitude is illustrated and provided with legend in curve A of FIG. 2.

The converter 24 is connected through a sample and hold circuit 28 to a sawtooth generator 30 via lines 32 and 34. The video-to-logic converter 24 is programmed, as will be shown and described in detail in relation to FIG. 4 hereinafter, to provide a positive binary output when the video signal S1 is above a threshold level set between the sky video level and the seascape video level. The output of converter 24 is passed on line 32 to the sample and hold circuit 28 which holds the appropriate binary level on each side of the horizon line. Sample and hold circuit 28 is provided to avoid momentary false signals that could be generated by whitecaps in the seascape or by dark areas in the sky.

The binary output S2 of the sample and hold circuit 28 is illustrated in FIG. 2, curve B. Signal S2 is passed to the sawtooth generator 30 via line 34 activating generator 30 to provide a sawtooth wave form S3, illustrated at FIG. 2, curve C, each time sample and hold circuit 28 changes binary state from a high level (representing sea).

Sawtooth waveform S3 is passed via lines 40 and 42 as one input to a dual gate FET (field effect transistor) amplifier 38. An adjustable frequency vertical sweep oscillator 44 feeds a sinusoidal signal to the second input 46 of amplifier 38. Dual gate amplifier 38 combines and amplifies the two input signals mentioned above to form a modulated waveform S4 illustrated in FIG. 2, curve D. The undesirable sawtooth offset indicated in curve D is removed by summing signals S3 and S4 in a summing circuit 48. Thus, signal S4 is fed on input line 50 to summer 48 and signal S3 is fed on lines 36 and 52 to summer 48. The output signal S5 from summing circuit 48 is illustrated in curve E, FIG. 2. Signal S5 is the desired sinusoidal modulating signal which increases in amplitude from far to near, i.e., from a zero level at the horizon to a maximum amplitude at the lower edge of the displayed seascape. Signal S5 is fed on line 54 to a vertical sweep summer circuit 56 in the control unit 14 where it modulates the vertical sweep signal to form a signal S6 which is illustrated in curve F, FIG. 2. Signal S6 is a modulation of the vertical sweep signal generated by a vertical sweep generator 58 and passed on line 60 to summer 56. Signal S6 is passed via line 62, sweep amplifier 64 and line 66 to provide the necessary vertical sweep modulation to camera 10.

Stationary waves can be attained at the display by setting the frequency of the oscillator 44 to an exact multiple of the vertical frame frequency. The waves will appear to move in or out (up or down on the display monitor 16) when the frequency of oscillator 44 is offset from a multiple of the television vertical sweep frequency by a wave speed setting S7 of the resistor R32 which is the frequency adjusting element of the oscillator 44. The amplitude of the waves can be changed by sea-state setting S8 which is an adjustment of the potentiometer R37 and which controls the amplitude of the sinusoidal output signal of oscillator 44.

The description thus far has related to vertical sweep modification for generating apparent wave motion up and down on the display 16. Referring to FIG. 1 the circuit can be extended to generate apparent wave movement across the seascape. This involves a horizontal sweep generator 72, summer 74 and sweep amplifier 76 connected by lines 78, 80 and 82 to feed a horizontal sweep signal into camera 10. This signal is modified by the output of generator 30 by way of a varistor 84, horizontal oscillator 86, dual gate FET amplifier 88 and summer 90 connected by lines 92, 94, 96, 98 and 100 between the sawtooth generator 30 output 40 and the horizontal sweep generator summer 74. Sawtooth signal S3 is fed on line 92 into the varistor 84, whose output is applied via line 94 to point 102 to vary the voltage potential thereof and hence the seastate. The S3 wave signal is fed on line 106 to the dual gate amplifier 88 and on line 108 to the summer 90. The elements are thus quite similar to those described hereinbefore in relation to the vertical sweep modification and provide electronic means for generating apparent wave motion from left to right or right to left across the seascape as viewed in TV monitor display 16. The technique is applied to the linear horizontal deflection circuit of the TV camera 10.

In operation, signal S2 from sample and hold circuit 28 (FIG. 1) is passed to sawtooth generator 30 and the output signal S3 therefrom is fed to varistor 84 via line 92, to dual gate amplifier 88 via line 106, and to summer 90 via line 108. Sawtooth signal S3 via varistor 84 is applied at junction 102 to provide a composite sea state analog voltage setting S18 as one input to oscillator 86 to govern the amplitude of the signal therefrom. A second adjustment S17 of oscillator 86 is obtained through adjustment of potentiometer R132 to provide wave speed setting. Thus, composite signal S18 controls the output amplitude of oscillator 86. The addition of signal S3 modifies the sea state setting S18 to increase the amplitude of the waves near the bottom of the seascape display 16. The frequency of oscillator 86 is set by signal S17. In the same manner as previously described hereinbefore for vertical oscillator 44, the frequency of oscillator 86 is normally set at a fixed multiple of the horizontal sweep frequency plus or minus 1 to 10 percent of the horizontal sweep frequency. Wave speed adjustment or setting S17 provides the incremental change in oscillator frequency to control the speed of the wave motion across the seascape. When the frequency of oscillator 86 is an exact multiple of the horizontal sweep rate, the waves will appear to be stationary. Submarine periscopes have a capability of changing the magnification of the periscope view by a factor of 4. To simulate this change in periscope magnification, periscope view simulators normally use interchangeable lens at the camera input to change the apparent scene magnification by a factor of 4. In order to change apparent distance between waves for different periscope magnifications, two oscillator frequencies should be provided to feed dual gate FET amplifier 38. For high power magnification oscillator 44 should provide a modulating frequency of about 10 times the framing frequency ±1 to 6 cycles per second. For low power magnification, oscillator 44 should provide a modulating frequency of about 40 times the framing frequency ±4 to 24 cycles per second.

In periscope view simulation, it is desirable to have wave motion in the direction of the wind regardless of the periscope bearing. That is, if the wind is blowing from the north, the waves should move from the horizon toward the bottom of the field of view when the periscope bearing is toward the north. Similarly, the waves should appear to move from the bottom of the field of view toward the horizon when the periscope is pointed toward the south and the wind is from the north. The waves should appear to move across the seascape when the periscope bearing is east or west and the wave motion should appear to be diagonal across the seascape when the periscope bearing is between these settings.

Figure 3:
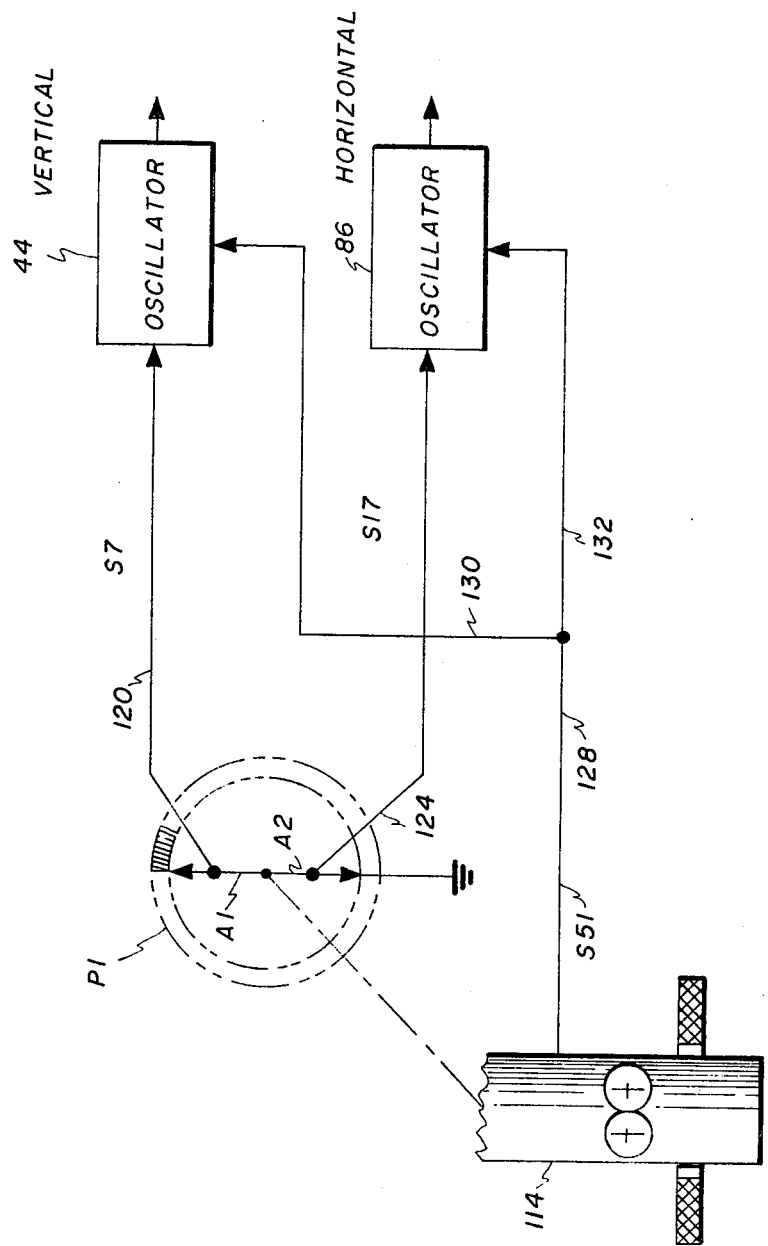
FIG. 3 is a diagrammatic representation of a periscope and associated potentiometer actuated by rotating the periscope to vary the voltage inputs to vertical and horizontal oscillator means of FIG. 1 to thereby provide variation in wave state and motion in accordance with bearing aspect of view.

In the diagrammatic view of FIG. 3, there is shown, in accodance with a further aspect of our invention, suitable means comprising a periscope and associated potentiometer activated by rotating the periscope to vary the resistance to ground setting for the vertical and horizontal oscillator means 44 and 86 to thereby provide variation in wave state and motion in accordance with bearing aspect of view. Thus, in the arrangement of FIG. 3 the wave settings S7 and S17 of FIG. 1 are obtained through the orthogonal wiper arms A1 and A2 of a continuous linear potentiometer P1. Two opposite sides of continuous potentiometer R1 are grounded. The wiper arms A1–A2 of potentiometer R1 are mechanically coupled, as indicated, to the simulated periscope 114 such that the wiper arms of P1 make one full turn for each full turn of the periscope. Arm A1 is connected to oscillator 44 via line 120 and arm A2 is connected to oscillator 86 via line 124. The position of the wiper arms shown in FIG. 3 is set to provide maximum wave speed from the horizon to the bottom of the field of view and no wave motion across the seascape display 16. In this setting arm A1 is at maximum resistance and arm A2 is at an intermediate resistance level corresponding to the exact frame frequency. Upon a 90° rotation of the periscope 114, wiper arms A1 and A2 of potentiometer P1 rotate 90° and result in maximum lateral wave motion. Upon a 180° rotation of the periscope and associated arms the result is a maximum wave speed from the bottom of field of view toward tthe horizon. The frequency of oscillator 44 should be set to an exact multiple of the vertical sweep frequency with wiper arm A1 set at the 90° from ground position. Similarly, the frequency of oscillator 86 should be set to an exact multiple of the horizontal sweep frequency with wiper arm A2 set at the 90° from ground position.

To simulate the four-to-one change in periscope magnification, a high/low power signal S51 may be fed from periscope 114 to oscillators 44 and 86, via lines 128, 130 and 132, to effect an appropriate change in oscillator frequency. The four-to-one change in each oscillator frequency will change the wave spacing to correspond to the simulated four-to-one change in periscope magnification.

Figure 4A:
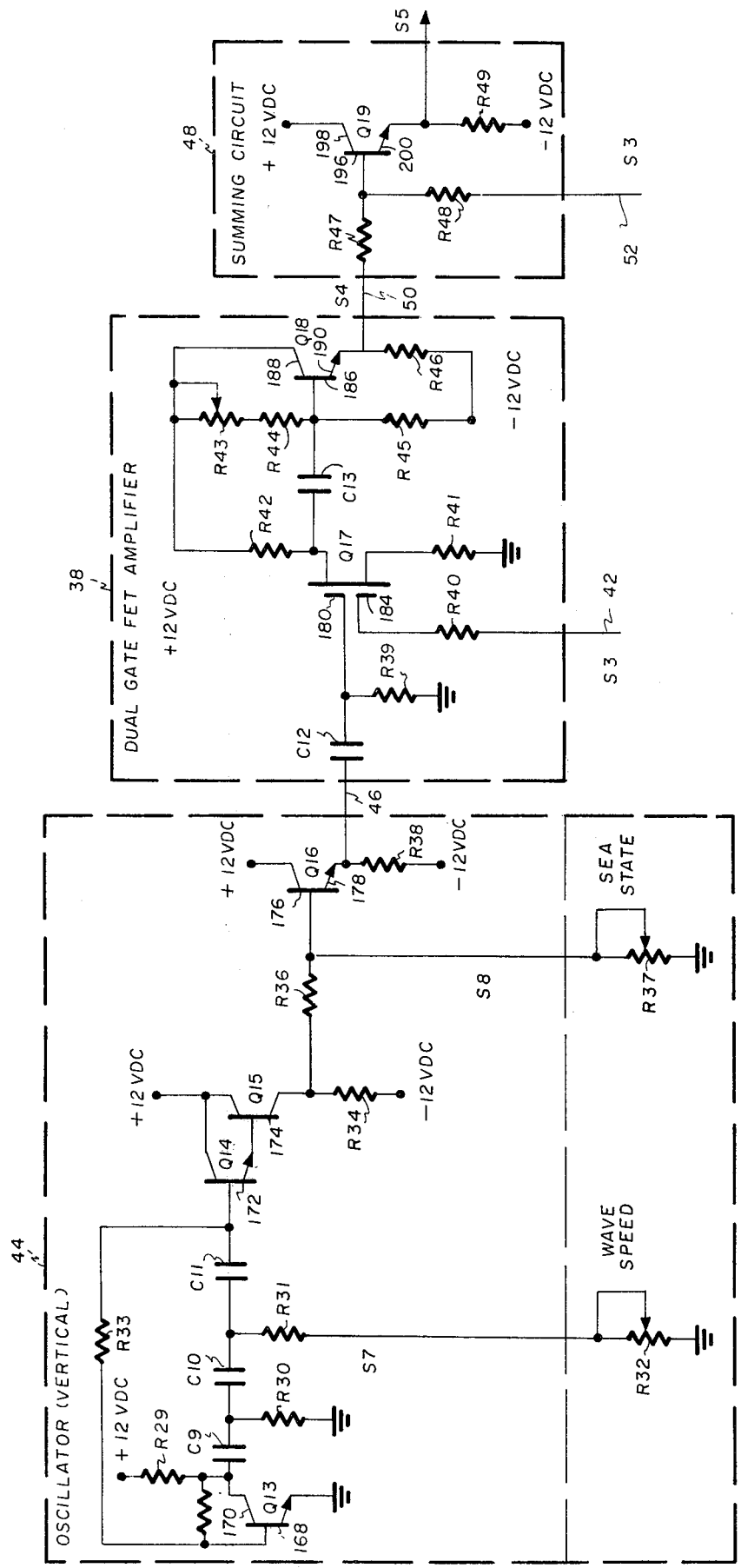
FIGS. 4A and 4B are a detailed electronic representation of the several block elements of FIG. 1.
Figure 4B:
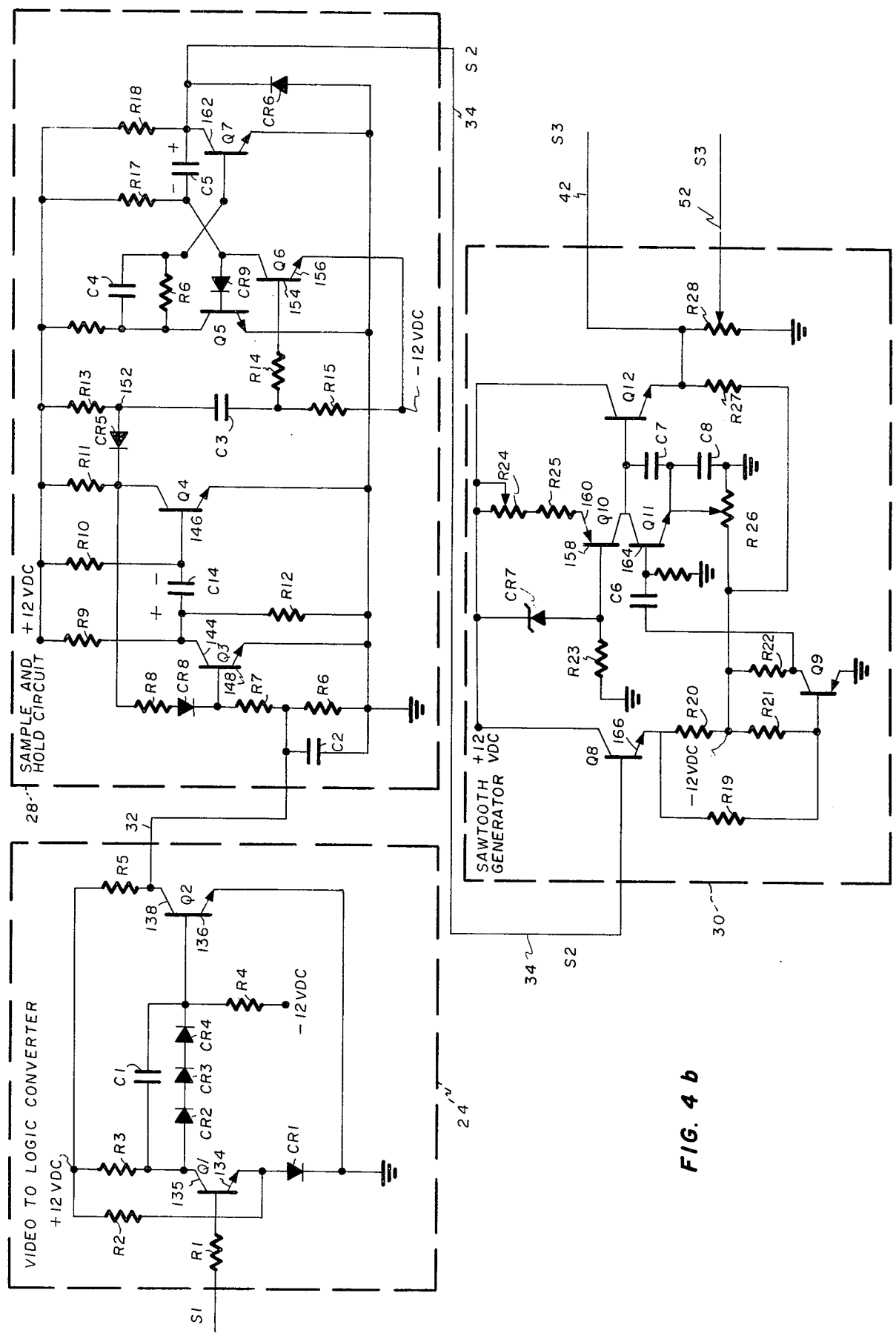

Each of the electrical and electronic elements of FIGS. 1 and 3 are common well known off-the-shelf items which may be applied to applicants' invention as described above without experimentation; however, to illustrate the application of suitable circuitry for the basic elements, the detailed circuits of FIGS. 4 and 6 are provided.

In FIG. 4, the video-to-logic converter 24 is shown to comprise elements R2 and CR1 connected to form a voltage divider circuit to bias transistor Q1 off. Since voltage drop across a diode is approximately 0.7 volts, the potential of the Q1 emitter 134 is ±0.7 volts and Q1 is off. The resulting current flow is from the ±12 VDC supply indicated through R3 and diodes CR2, CR3 and CR4 into the base 136 of transistor Q2 to bias Q2 to on condition. When video information is present at the S1 input signal indicated, current flows through R1 into Q1 base, thereby driving Q1 to an on condition. Q1 is the on condition diverts current to ground through CR1 lowering the potential on the input side of diode CR2 (i.e., at collector 135) to thereby take voltage off the base 136 of Q2 and condition Q2 to off condition. Thus, when video is present in signal S1, the emitter 138 of Q2 is high and the output 32 of converter 24 is high. In converter 24, the capacitor C1 is provided to speed up the switching of Q2.

In the sample-and-hold circuit 28, one portion of the circuit including transistors Q3 and Q4, coupling capacitor C14, feedback elements R8 and CR8 and associated resistors R7 through R12 form a one shot oscillator whose function is to sample output pulses from converter 24, which pulses are of varying width and to convert each pulse to a predetermined pulse width. C2 and R6 are noise suppressors. When no pulse is present on line 32 there is no bias current through R7 on base 148 of Q3 and Q3 is in off condition. In such state its collector voltage is high and capacitor C14 connected between the collector 144 of Q3 and base 146 of Q4 can be charged to the polarities + and − indicated. The charging of CR 14 comes from the +12 volt source indicated via R9. When a pulse is received from converter 24 on line 32 an enabling voltage is passed via R7 to the base 148 of Q3, placing Q3 in one condition. Current through Q3 then lowers the voltage at its collector 144 to begin the discharge of capacitor C14. The negative charge of capacitor C14 applied to the base 146 of Q4 holds Q4 in the off condition, and removing that negative charge by discharge of capacitor C14 will provide a positive enabling voltage to base 146 of Q4 via the +12 volt source and R10. While C14 is charged, its negative side applied to Q4 holds Q4 in the off condition. C14 cannot discharge immediately and thus a time period is provided by C14 for holding Q4 in the off condition. This predetermined time period is set by the values of C14, R10 and R9. While Q4 is off and its collector is high, current is fed back through R8 and CR8 via R11 and voltage source +12 VDC indicated, and holds Q3 in the on condition even after the original converter pulse from Q2 has terminated.

Transistors Q5, Q6 and Q7 and associated resistors, capacitors and diodes of sample-and-hold circuit 28, connected as shown in FIG. 4, provide the function of a missing pulse detector. Since a seascape and sky scene such as indicated at 12 in FIG. 1, contains fluctuations in brightness level only in the area of the water, video pulses will occur only during the scan of the water and no video pulses occur during the scan of the sky. In view of the above, when video pulses occur, Q7 is on and when the pulses terminate, Q7 is conditioned off. When a pulse is received, Q6 is turned on, base drive being supplied through R13, C3 and R14 from +12 volt supply indicated. CR5 lowers the voltage at the juncture 152 when Q4 is on. Since Q4 is off when Q3 is on, the above mentioned drive signal is passed via C3 and R14 to base 154 of Q6 to place Q6 in the on condition. Conditioning Q6 to on condition enables the charging of capacitor C5 through R18 and Q6, the emitter 156 of Q6 being connected to a source of −12 VDC as indicated.

After the video pulse from converter 24 is terminated, the charge on capacitor C5 continues to hold Q5 off and Q6 on. Q5 is held off by a negative potential via Q6 and diode CR9 from the −12 VDC source. Should another video pulse occur before C5 can discharge completely, capacitor C5 will immediately recharge and continue to hold Q5 off and Q7 on. When the video pulses terminate, C5 discharges completely and Q5 is no longer held in the off condition. Q5 is turned on when base current is obtained through R17 and CR9. When Q5 is on the base current to Q7 normally obtained through R6 is terminated and Q7 is conditioned off.

Thus, sample-and-hold circuit 28 functions to filter out the undesirable fluctuations in the binary signal received via line 32 from video-to-logic converter 24 such that circuit 28 feeds a sweep initiating voltage to sawtooth generator 30 only at the instant that the seascape horizon is scanned by camera 10 of FIG. 1. Circuit 28 prevents false sweeps which would initiate wave action in undesirable areas of the seascape scene such as the sky or clouds.

Continuing with FIG. 4, the circuit 30 illustrates one suitable form of sawtooth generator which is essentially a ramp generator. The elements connected as shown in FIG. 4 include buffer transistors Q8 and Q12, a transistor switch Q11 connected across a capacitor C7 to provide timing means, transistor means Q9 for polarity and voltage control and a transistor Q10 provided as a constant current source. Thus, in the circuit 30 the sawtooth wave form is produced by charging and discharging the capacitor C7. The rate must be constant to provide linearity of the charging curve. The slope of the ramp voltage is controlled by the rate of charge. The length of curve, i.e., the cutoff, is controlled by the switch means Q11 in turn controlled via Q9 and Q8 from the incoming pulse Sz obtained from the sample-and-hold circuit 28. Thus, Q10 is a constant current source. CR7 and R23 connected between a +12 VDC source and ground and to the base 158 of Q10 as shown, provide a constant base drive for Q10. Adjustable potentiometer R24 and resistor R25 connecting the emitter 160 of Q10 to the +12 VDC source provide control of the rate of charge of C7 and hence the slope of the charge and resultant curve. Q8 is provided and connected as a buffer between the collector 162 of Q7 and the base of Q9. Q9 connected to ground and to the base 164 of Q11 as indicated converts the pulses from the emitter 166 of Q8 into pulses having the proper polarity and voltage levels to control Q11. Q11 is connected as indicated and functions as a transistor switch across C7 which controls charge timing and also provides for discharging C7. R26 and capacitor C8 connected to Q11, C7 and ground as shown and to a −12 VDC source indicated provide means for adjusting the base line of the generated ramp. Transistor Q12 connected as a buffer between C7 and R28 is provided to assure that, C7, the ramp generator element, is not loaded.

As regards the oscillator 44 one suitable circuit is shown in FIG. 4 as a schematic of an RC phase shift oscillator. The circuit includes an RC network including transistor Q13 and sections C9–R30, C10–R31 and C11–R33 connected in feedback to the base 168 of Q13. An additional variable resistor R32 is provided to vary the frequency according to the wave speed desired. Also included is a Darlington buffer comprising Q14 and Q15 connected between positive and negative DC voltage supplies indicated and a Q16 buffer transistor connected to the same sources. A variable resistor R37 is connected as shown to base 176 of Q16 and to ground and is adjustable to vary the amplitude of signal and hence the apparent sea state. It is well known that an amplifier will oscillate if positive feedback is applied and that it will oscillate at the frequency where the feedback is shifted 360°. Any input signal applied to base 168 of transistor Q13 will be inverted (shifted 180°) at the collector 170 output. The RC combination of C9, R30, C10, R31 and R32, C11 and R33 will shift the Q13 output signal another 180°. Each section of network, as for example C9 and R30 provides a 60° shift in the signal. By making one of the phase shift sections variable, as at R32, the oscillator frequency can be varied and fine tuned. Q14 and Q15 is a Darlington buffer to prevent loading the RC phase shift oscillator, i.e., the circuit 44. The oscillator signal from capacitor C11 is passed through the base-emitter junctions 172 and 174 and R36 to the base 176 of buffer transistor Q16. R37, R38 and Q16 control the gain of the generated sine wave and thus R37 varies the sine wave amplitude to vary the sea state to be displayed.

Considering the dual gate FET amplifier 38 a suitable circuit is shown in FIG. 4 which includes resistor R42, field effect transistor (FET) Q17 and resistor R41 connected between a +12 volt source of direct current, indicated, and ground, indicated. Transistor Q17 receives the constant amplitude sine wave signal fed from the emitter 178 of transistor Q16 through coupling capacitor C12 as the input to one of its gates 180. The ramp voltage generated in the sawtooth generator 30 is fed on line 42 through resistor R40 to the second gate 184 of Q17. Amplification of the output sine wave is increased as the amplitude of the ramp voltage is increased. The output signal from Q17 is fed through a capacitor C13 to the base 186 of a buffer transistor Q18 which has its collector 188 connected to the +12 volt direct current source indicated and its emitter connected through R46 to a −12 volt direct current source indicated. Resistors R43, R44 and R45 are provided as indicated to bias and adjust the circuit.

The output of the dual gate amplifier 38 (waveform S4) is passed on line 50 through resistor R47 as one input to the base 196 of a summing transistor Q19. The other input (waveform S3) is obtained from the sawtooth generator 30 via line 52 and resistor 48. The transistor Q19 has its collector 198 connected to the +12 volt direct current source and its emitter 200 connected through resistor R49 to the −12 volt direct current source indicated. Q19 along with R47 and R48 sums the inputs from the amplifier 38 and generator 30 producing the wave form S5 of curve E, FIG. 2.

The duplicate circuits for the horizontal sweep portion of FIG. 1 are not given in detail as a repetition of the circuit would not aid in understanding the invention. Also, the applicant's invention is not in the individual circuits of the blocks of FIG. 1 and the detailed circuits given are simply exemplary.

Figure 5:
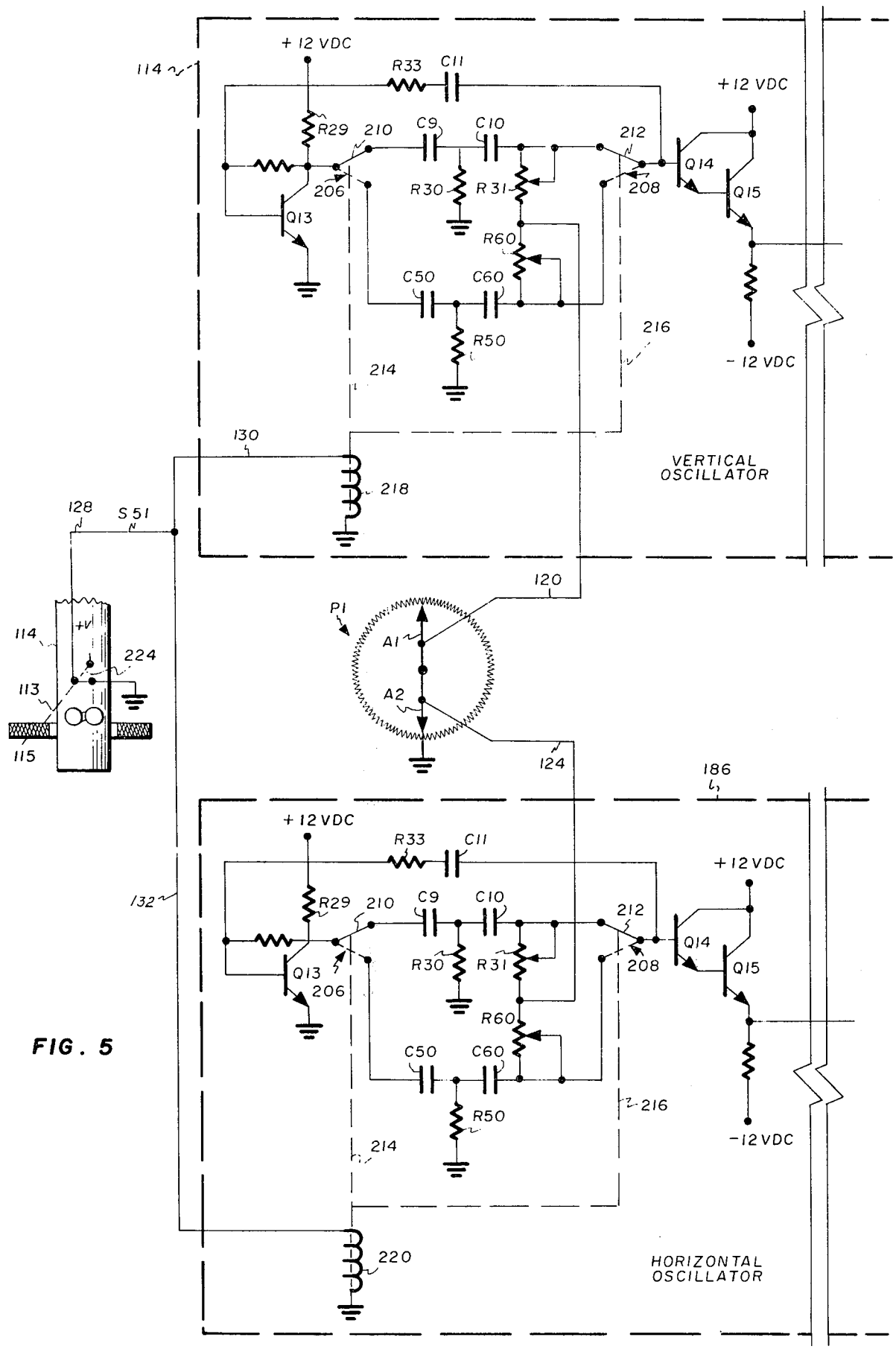
FIG. 5 is a detailed electronic representation of block elements of FIG. 3.

In relation to FIG. 3 we have shown and described a potentiometer means P1 for coordinately varying the wave speed setting of oscillators 44 and 86 and have also suggested the provision of means for providing a multiple of basic oscillator frequency to thereby provide power magnification of four-to-one by manually operating a switch means on the periscope itself. In FIG. 5 there is shown details of suitable circuitry for accomplishing the above including a modification (by way of addition) to the oscillators 44 and 86. In modified form the oscillators are referred to as 144 and 186 and only the modified portion of the circuit relating to means for changing basic frequency is shown in the details of FIG. 5. The remaining amplification portion of the circuit is the same as 44 and 86 and repetition is thus not required. In FIG. 5 the same numbering as used in FIGS. 3 and 4 is employed for the same elements. Thus, in oscillator 144 the basic RC, including elements R29, Q13, C9, C10, C11, R30, R31 and R33 remain the same except that R31 is made adjustable for initial frequency setting and adjustable potentiometer P1 provides the variable resistance to ground for adjusting frequency as the periscope is turned. However, to provide a multiple of the basic frequency to provide the wave magnification effect, an alternate loop three RC sections are provided which include new sections C50–R50 and C60–R60 of different selected register and capacitor values with R60 being adjustable as indicated. To switch from the RC network of C9–R30, C10–R31 and C11–R33 to the different valued network of C50–R50, C60–R60 and C11–R33 switches 206 and 208 having arms 210 and 212 are provided. The arms 210 and 212 are mechanically connected as indicated by dotted lines 214 and 216 to relay means indicated by coil 218. Coil 218 is connected via lines 128 and 130 to be operated from an off-on switch 224 built in the periscope 114 and operated as indicated by dotted line 113 from periscope handle 115. The same circuitry and switching means described for the vertical oscillator 144 is provided for the horizontal oscillator 186 and switching to the higher magnification is accomplished from the common switch 224 and common line 128 via a line 132 connected to the relay 220 of oscillator 186.

Variable resistors R31 and R60 in oscillator 144 provide the means for adjusting the frequency of oscillator 144 to a multiple of the television frame frequency to provide no wave motion when arm A1 of potentiometer P1 is set at the 90° from ground position. Similarly, variable resistors R31 and R60 in oscillator 186 provide the means for adjusting the frequency of oscillator 186 to the exact television line frequency to provide no wave motion when arm A2 of potentiometer P1 is set at the 90° from ground position.

In operation, turning the periscope 144 varies the resistance in one section of each of the associated low and high power RC circuits cutting out resistance in one as resistance is added into the other, both by way of the potentiometer P1 whose arms A1 and A2 rotate with the periscope. Operating the handle 115 to close switch 224, i.e., to move it to dotted line position, energizes relays 218 and 220 to move switches 206 and switches 208 to the dotted line positions of respective arms 210 and 212 to introduce the multiple frequency elements to provide more magnification.

What is claimed is:

1. A synthetic motion generator system for simulating motion in a display originating from a still life scene comprising:
    a. a television display unit for providing a display scene when actuated;
    b. a television camera for developing video signals of a still life scene;
    c. a camera control unit including a video amplifier connected to pass video signals to said television display unit and including a sweep control circuit for generating and passing vertical and horizontal sweep signals to said camera; and
    d. a sawtooth generator means, frequency tuneable oscillator means and mixing circuit means connected to said sweep control circuit to modulate the vertical and/or horizontal sweep voltages passed to said camera with a modulating signal which is a multiple of the television frame rate, plus or minus a few cycles per second, to generate desired motion in said display scene.

2. A synthetic seawave motion generator for simulating seawave motion in a display derived from a still life seascape scene comprising:
    a. a television display unit;
    b. a television camera for producing video signals of said still life seascape scene;
    c. a camera control unit including video amplifier means connected to pass video signals from said camera to said television display unit and including also at least one sweep control circuit including generator and amplifier means for generating and passing sweep signals to said camera;
    d. each said sweep control circuit including a sweep signal summation circuit for receiving sweep modulating signals and sweep generator signals;
    e. modulator circuit means having at least one modulator circuit comprising a frequency tuneable oscillator and a sawtooth generator, a dual gate amplifier converted to receive inputs from said oscillator and generator and a modulator summation circuit connected to receive inputs from said dual gate amplifier and said generator to provide sweep modulating signals to said sweep summation circuit; and
    f. a triggering circuit including a video-to-logic converter and a sample-and-hold circuit connected in series between said sawtooth generator and said video amplifier output to activate said sawtooth generator each time said sample-and-hold circuit changes binary state from a high level representing sky to a low level representing sea;
    g. said oscillator being tuneable to a frequency which is an inexact multiple of the television frame rate to provide a selected desired wave motion along one linear direction.

3. Apparatus according to claim 2, wherein
    a. means are provided for varying the amplitude voltage output of said oscillator to thereby vary the apparent height of said waves.

4. Apparatus according to claim 2, wherein
    a. said camera control unit includes both vertical and horizontal sweep control circuits; and
    b. said modulation circuit means includes two modulator circuits, one for vertical and one for horizontal sweep control to provide for wave motion along two directions normal to each other.

5. Apparatus according to claim 4, including
    a. means representing a submarine periscope;
    b. a continuous potentiometer having one grounded terminal and two wiper arms disposed in quadrant arrangement in slidable connection to said potentiometer and respectively electrically connected to the vertical sweep and horizontal sweep oscillators while also being mechanically connected to said periscope means for rotation therewith such that 360° rotation of said periscope means will sequentially produce wave conditions representing all 360° of view from said rotatable periscope.

* * * * *